Jan. 12, 1954　　　M. PENNANEN　　　2,665,719
ANCHORING DEVICE FOR PORTABLE CHAIN SAWING MACHINE BLADES
Filed Dec. 28, 1951　　　2 Sheets-Sheet 1
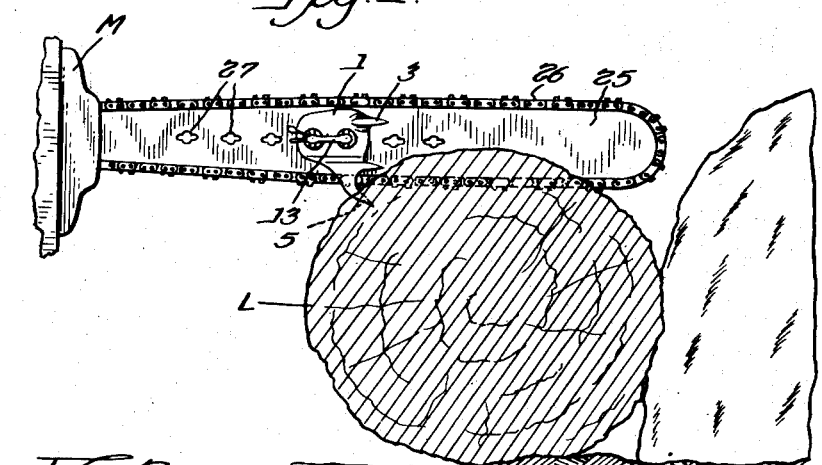
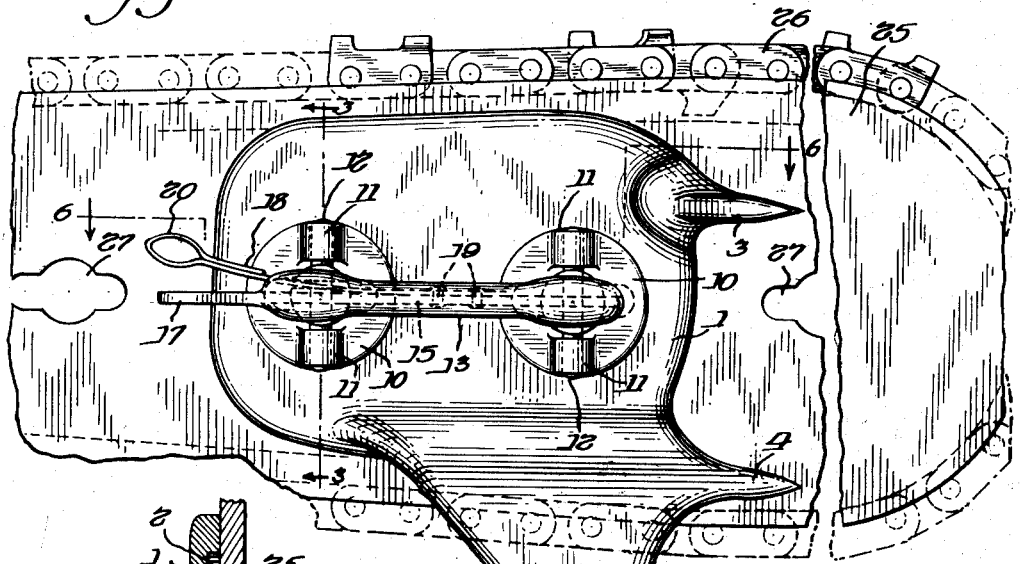
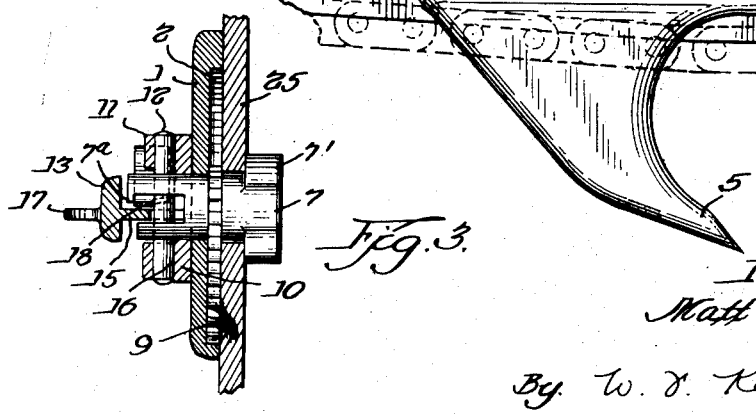
Inventor
Matt Pennanen
By W. J. Kellogg
Atty.

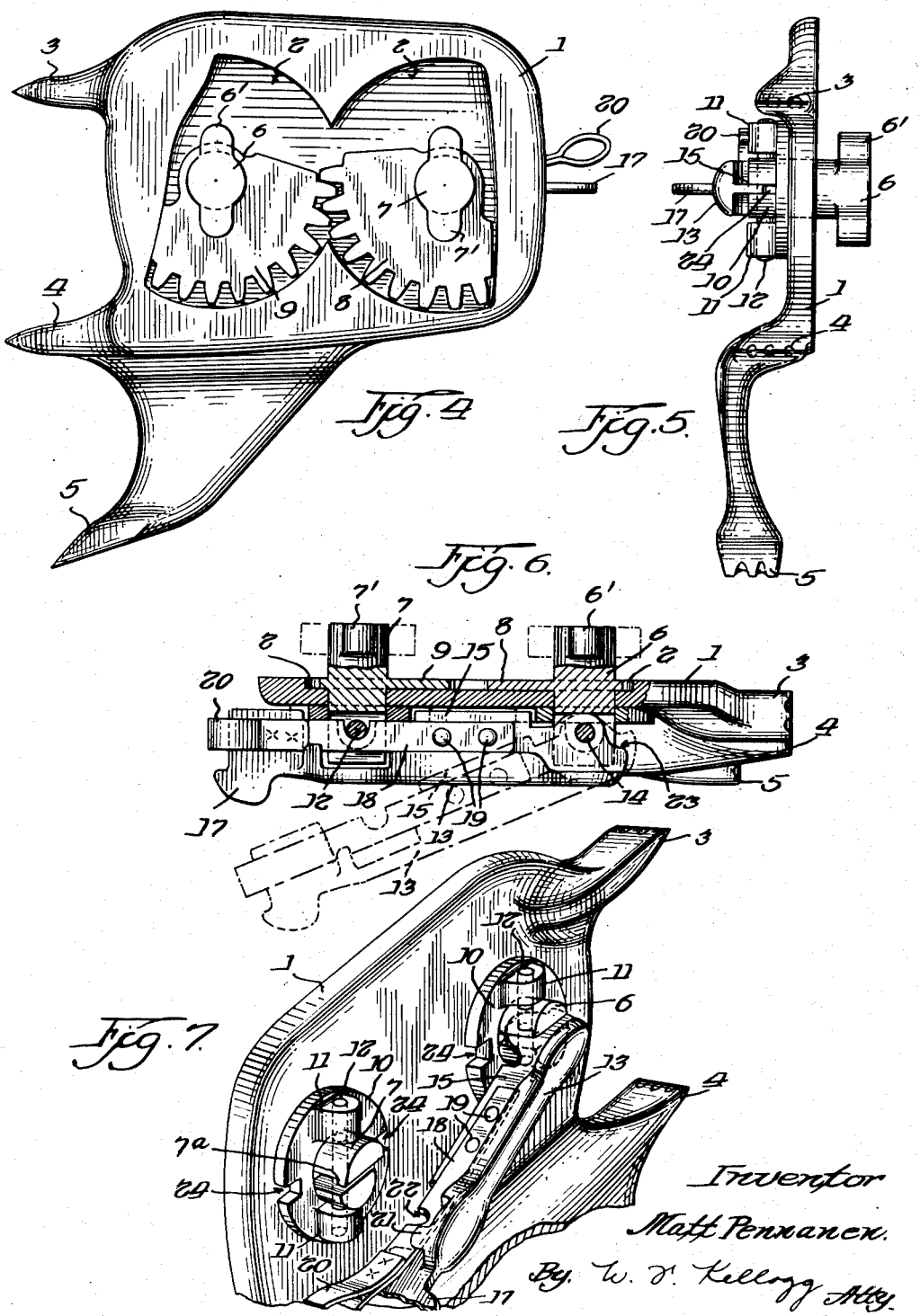

Patented Jan. 12, 1954

2,665,719

UNITED STATES PATENT OFFICE 2,665,719

ANCHORING DEVICE FOR PORTABLE CHAIN SAWING MACHINE BLADES

Matt Pennanen, Herman, Mich.

Application December 28, 1951, Serial No. 263,750

5 Claims. (Cl. 143—32)

This invention relates to improvements in portable sawing machines, having for an object to provide an attachment for such whereby the articulated endless saw forming a part thereof will be retained in a secure and effectually operable initial sawing position and caused to be positively advanced into and through its cut in a tree or timber during felling or bucking operations with the least possible effort and/or labor on part of the user, and in a minimum of space.

It is an equally important object of the invention to provide a device of the above stated character, so constructed, attached to and operable upon a portable sawing machine that the latter can be conveniently, easily and efficiently operated in confined and/or restricted areas or spaces, hence, rendering the same advantageous for use by woodsmen or sawyers in felling trees or bucking logs growing or lying in difficult if not substantially inaccessible or foreign object congested locations, i. e., adjacent tree stumps, earth surface undulations, rocks and the like.

Another object of the invention is to provide an anchoring device for attachment to the blade of a portable sawing machine, capable of convenient and quick adjustment and fixed positioning thereon whereby to limit the extent of engagement of the machine blade, and hence, its articulated endless saw with a body to be sawed, and also, to facilitate the initial and thereafter, the progressive cutting or sawing engagement of the endless saw with and through said body.

Yet another object of the invention is to provide a portable sawing machine blade anchoring device which is capable of being adjusted to predetermined or preselected positions longitudinally of said blade, the device being quickly and easily releasable from the blade for facilitating and accelerating such adjustment and as easily, quickly and surely locked to the blade in a particularly adjusted position.

The foregoing, as well as other objects, advantages and meritorious teachings of my invention, will be in part obvious and in part pointed out in the following detailed disclosure thereof, when taken in conjunction with the accompanying drawings, it being understood that the form of invention presented herein is precise and what is now considered to be the best mode of embodying its principles, but that modifications and changes may be made in specific embodiments without departing from its essential features.

Figure 1 is a side elevation of a portable sawing machine blade equipped with the invention, wherein said blade is retained in an adjusted relation to a felled log in an access difficult lie; the motor drive and/or casing therefor being but fragmentally illustrated.

Figure 2 is a fragmentary side elevation of the blade and articulated endless saw of a portable sawing machine equipped with the invention.

Figure 3 is a vertical section taken on the line 3—3 of Figure 2, looking in the direction in which the arrows point.

Figure 4 is a side elevation of the improved anchoring device looking towards its normally inner or saw blade adjacent side.

Figure 5 is an end elevation of the anchoring device, looking toward the spurs carried by its body.

Figure 6 is a horizontal fragmentary section taken on the line 6—6 of Figure 2, looking in the direction in which the arrows point, and Figure 7 is a fragmentary detail in perspective of the anchoring device, showing its normally outer side and the lockable operating lever thereof.

Referring in detail to the accompanying drawings, the invention comprises a substantially flat and rectangularly shaped body indicated in its entirety by the reference numeral 1, made of cast, forged or otherwise suitably fabricated metal having semi-circularly shaped comparatively shallow and communicating juxtaposed chambers 2 in and opening onto its normally inner face and longitudinally disposed, spaced and horizontally arranged bearing openings in its inner wall concentrically of said chambers.

A plurality of relatively vertically spaced and outwardly extending spurs 3, 4 and 5 are fixedly carried on or are integral with the normally outer vertical side of the body 1 having their outer and biting ends chisel shaped and serrated to ensure positive bite in an engaged portion of a log, timber, etc. Each of said spurs are substantially horizontal, although the lower one, identified at 5, is preferably somewhat downwardly and obliquely disposed and is below the lower side of the device body (disposed at an acute angle with relation to the next spur 4) and terminates slightly inwardly of the bite portions of the spurs 3 and 4; also, the spurs 4 and 5 are offset laterally and outwardly of or from said device body (see Figure 5) for a purpose which will be hereinafter more fully described.

Rotatable complementally T-shaped pins 6 and 7 are suitably journaled in the aforesaid spaced and horizontal bearing openings in the body 1, and integral with or fixedly mounted on their intermediate portions are flat segmental gears 8 and 9 of thicknesses substantially corresponding to the depths of said semi-circularly shaped chambers 2 so that said gears will lie substantially flush with the normally inner flat face of the body 1, in the manner clearly shown in Figure 6 of the accompanying drawings.

The segmental gears 8 and 9 are enmeshed so that upon rotation of the T-shaped pin 6, the remaining pin 7 will be collectively rotated.

The normally inner and extended ends of the pins 6 and 7 attain their respective T-shapes by means of lips or extensions 6' and 7', preferably integral therewith, it being here noted that these T-heads are spaced inwardly from or apart from the normally flat inner face of the device body.

Circularly or otherwise suitably shaped washers 10 are engaged with and over the opposite extended ends of the bearing pins 6 and 7 and have bearing engagement on and with adjacent portions of the normally outer face of the device body 1; diametrically opposed apertured ears 11 being formed on the outer sides of the washers, for a purpose which will be presently described. Said outwardly extended ends of each of the rotatable pins 6 and 7 are bifurcated and have diametrically disposed lock pin receiving openings therethrough at substantially right angles to the same, whereby locking pins 12 may be engaged in and through the same and in the adjacent diametrically opposed apertured ears 11. Thus, it will be seen that the rotatable pins 6 and 7, plus the segmental gears 8 and 9, will be prevented from displacement with respect to the device body 1 and to the segmental gear receiving chambers 2, hereinbefore described.

One side of the bifurcated outer end portion of the rotatable pin 7 is longer than the other thereof and is formed with a lip 7a overlying the kerf of the bifurcation.

The extent of rotation of the segmental gears 8 and 9 in their respective chambers 2 in the device body 1 is limited by the shape and/or size of said chambers. Thus, when the pins 6 and 7 and their segmental gears 8 and 9 are collectively rotated in one direction, the upper sides of said gears will abut the upper side portions of their respective chambers 2 and be stopped. In such positions, the T-heads of the rotatable pins will be substantially parallel to the upper and lower sides of the body 1 and disposed longitudinally of said body (see the dotted line showing in Figure 6 of the drawings). However, when these pins 6 and 7 and their segmental gears 8 and 9 are collectively rotated in an opposite direction, the lower sides of the gears will abut the lower side portions of their chambers 2 and be stopped. In such a stopped position, the T-heads of the pins 6 and 7 will be disposed vertically or transversely of the device body 1 and in substantial parallelism to each other and to the opposite ends of the body in the manner shown in Figures 4, 5 and 6.

In order that collective directional preselected rotary motion may be imparted to the pins 6 and 7, and segmental gears 8 and 9, I provide the device with an operating lever 13. Said lever comprises a body whose one end is pivotally mounted at 14 in the bifurcated outer end portion of the rotatable pin 6 and whose inner lower intermediate portion is substantially blade-like, as indicated at 15. The outer end portion of this blade-like portion 15 is engageable or receivable, at times, in the kerf of the bifurcated outer end of the rotatable pin 7 and it is recessed at 16 for engagement over the intermediate portion of the adjacent lock pin 12. A suitable handle 17 is on the free end of the lever 13, for an obvious purpose, while an outwardly sprung spring latch blade 18 is secured at one end, as at 19, to the lever body intermediate portion 15 with its outer end portion handle provided at 20 and spaced laterally from the lever body blade-like portion in abutting engagement with a stop finger 21 on the lever free end (see Figure 7). A portion of the spring latch blade 18 adjacent the recess 16 in the lever body is similarly recessed, as at 22, for an obvious purpose.

When the T-heads of the pins 6 and 7 are in those positions shown in Figures 4, 5 and 6 of the drawings, the kerfs of the bifurcated outer ends of said pins are longitudinally aligned and the bladed lever 13 is swung to its innermost position with relation to the device body 1. In this position, the lever blade portion 15 and its spring latch blade 18 will be engaged in the respective kerfs of the pins 6 and 7 and the laterally sprung latch blade will be lockingly engaged under the kerf overlying lip 7a of the pin 7; also, the lower sides of the segmental gears 8 and 9 will be in abutting engagement with adjacent lower side portions of the body chambers 2 (see Figure 4).

By pressing the spring latch blade 18 inwardly to disengage from under the lip 7a, the lever 13 may be swung freely outwardly from the device body 1, as shown in dotted lines in Figure 6. To limit the extent of such outward swinging movement, the pivoted end of the lever may be and preferably is shouldered at 23 for abutting engagement with an adjacent portion of the near washer 10.

If desired, diametrically opposed pockets or recesses 24 may be formed in the peripheral or marginal portions of the washers 10 so that with arrangement of the lever 13 in its closed or innermost position, as immediately above described, the opposite end portions of the lever body blade 15 will be engaged in and through said pockets (see Figure 6). Thereby, an additional locking of the pins 6 and 7 and their respective segmental gears 8 and 9 against rotation in the device body bearing openings will be effected.

At this point, it is noted that my improved portable sawing machine anchoring device is capable of attachment to and satisfactory usage on substantially any now prevalent form or type of sawing machine, particularly, those which employ an articulated endless saw and a supporting blade over or about which the saw operates. To illustrate one such an adaptation, I have shown a portable sawing machine blade 25 comprising a flat elongated body on and about which a chain saw 26 is mounted and operatively travels in a predetermined direction. Said blade has a series of relatively and preferably equispaced openings generally identified by the numeral 27 formed in and longitudinally thereof. These openings are of shape and size substantially corresponding to the shape or contour and size of the T-heads on the inner ends of the rotatable pins 6 and 7 whereby to snugly admit the same therethrough and/or therefrom; also, the distance of spacing between said series of openings 26 corresponds to the distance of spacing between the T-heads 6' and 7' on the inner ends of the rotatable pins 6 and 7.

A suitable and portable power supply means, such as a motor, indicated by the letter M, is provided the chain saw 26 and is connected to and carries the sawing machine blade 25.

In use of my invention in connection with or on the blade of a portable sawing machine, such as hereinbefore described, the anchoring device is adjusted to the desired position on the blade 25 adjacent a pair of the openings 27 therein. At this time, the lever 13 will have been swung outwardly in the manner illustrated in dotted lines in Figure 6 of the drawings. Thereupon, said lever is swung upwardly, rotating the pin 6 and transmitting such rotation via the enmeshed segmental gears 8 and 9 to the pin 7, causing it to be collectively rotated. This rotation will bring the T-heads of the pins 6 and 7 to the position shown in dotted lines, again in Figure 6. With the T-heads of the rotatable pins thus arranged, the device body is moved into engagement with an adjacent side of the blade 25 and the pins are entered into or through the particularly adjacent and aforesaid openings 27 in said blade. Thereupon, the operating lever 13 is swung downwardly to its original position, and then is swung inwardly toward the adjacent side of the device body 1, whereupon the bladed portion 15 of the lever will be aligned with the kerfs of the bifurcated outer ends of the pins 6 and 7. The handled end 20 of the spring latch blade 18 is moved toward the operating lever 13 and said operating elever is then moved entirely into the kerfs in the adjacent outer and bifurcated ends of the rotatable pins 6 and 7. With release of the handle 20 of the spring latch blade 18, the outer end portion of said blade will move laterally under the lip 7a of the pin 7, and so, will prevent accidental or unwanted outward pivotal movement and disengagement of the operating lever 13 and its blade portion 15 from the kerfs in the bifurcated ends of the pins 6 and 7.

As hereinbefore described, the extent of rotary movement of the segmental gears 8 and 9 under influence of the operating lever 13 is limited by the abutting engagement of the opposite sides of said segmental gears with adjacent side portions of their respective chambers 2 in and opening onto the normally inner face of the device body 1.

With the anchoring device thus mounted in the preselected position on the blade 25 of the portable sawing machine, it will be noted that the outer end of said blade is of a length substantially corresponding to the diameter of the cross-sectionally circular log or timber to be sawed thereby; hence, that when it is laid on and transversely of such log or timber, now indicated by the reference letter L, its outer end will not extend beyond the outermost peripheral portion of the log or timber L. Consequently, the thus equipped machine is made especially advantageous and convenient for use in felling and/or sawing timbers and/or logs which stand or lie in foreign object congested locations or in substantially inaccessible places, as for instance, should a tree to be felled by a sawyer be adjacent or even contacting other trees and similar extraneous objects, or should a felled tree lie adjacent or even abutting rocks and other foreign objects, or in or adjacent earth surface undulations. By adjusting the device body 1 on or along the sawing machine blade 25 in the manner above described, it will be understood that the outer or extended portion of said blade may be varied in its length, and this according to the diameter or size of the timber or logs to be felled or buck sawed by the machine; it being borne in mind that the length of the sawing machine blade 25 outwardly of or beyond the adjustably positioned and secured anchoring device corresponds or substantially corresponds to the thickness and/or the diameter of the material to be sawed.

Having thus adjusted the anchoring device on and secured it to the sawing machine blade 25, said blade is laid over and transversely of the timber or log L, in the manner indicated in Figure 1. Thereupon, the lower spur 5 of the device body 1 is punched into or bitingly engaged with the bark or substantially outer surface of said timber or log. In this way, the sawing machine blade will be securely held in position for the starting saw cut or kerf in the timber or log L, and moreover, the chain saw 26, moving from right to left, will effectually enter into the timber or log L without causing displacement of the blade with relation thereto, as through the force exerted thereonto from the saw.

As and when the starting cut or kerf is made in the timber or log L, the blade 25 and the endless saw 25 enter downwardly thereinto. At this time, the spur 5 is disengaged from the timber or log and upon downward movement of the device body 1, the middle spur 4 is punched into and bitingly engaged with an adjacent portion of the timber or log, following which the timber or log engaged portion of the endless saw will be maintained in effective cutting engagement therewith.

As the sawing of the timber or log progresses and the blade 25 and endless chain saw 26 advance therethrough, the spur 4 is disengaged from the timber or log and the uppermost spur 3 is punched into and bitingly engaged with an adjacent portion thereof, thus, anchoring the timber or log engaged portion of the sawing machine for the completion or finishing of the saw cut.

By reason of the hereinbefore described lateral offsetting of the chisel-like spurs 4 and 5 with relation to the device body 1; also, the somewhat laterally offsetting of the chisel-like spur 3 with relation to said body, the device body will be so positioned and retained on the sawing machine blade 25 that it will not interfere with the sawing efficiency of the endless chain saw 26, nor in any manner whatsoever block or otherwise close the saw kerf in the timber or log L.

In view of the foregoing, it will be understood by persons skilled in the art, that my improved sawing machine blade anchoring device is most advantageous for use in felling and/or buck sawing timber and/or logs standing or lying in places difficult of access in that said sawing machine blade may be caused to be arranged over a predetermined portion of timber or log to be sawed, without extending outwardly beyond the same; furthermore, that the sawing machine blade anchored to the timber or log in the hereinbefore described manner will be caused to positively start, progressively maintain and satisfactorily complete its cut through the timber or log with a minimum of effort upon part of the sawyer and with little likelihood of breaking, damaging or otherwise impairing the operating efficiency of the equipped sawing machine. Also, a sawing machine blade provided with my improved anchoring device will greatly reduce the time required to fell timbers or buck saw logs, thus, enabling a user of the same to increase his productive work.

I claim:

1. A sawing machine blade anchoring device, comprising a body having a plurality of relatively vertically spaced spurs on and extending from one end thereof, a plurality of spaced and headed pins rotatably mounted on and longitudinally of the body and extending outwardly from one side thereof, gears mounted on portions of said pins enmeshed and adjacent one side of said body, and manually operable means connected to one of said rotatable pins whereby to facilitate rotation of the same.

2. A sawing machine blade anchoring device, comprising a body, a plurality of relatively vertically spaced spurs on and extending from one end of said body, a plurality of spaced and headed pins rotatably mounted on and longitudinally of the body extending outwardly from and beyond one side thereof, gears mounted on portions of said pins enmeshed and adjacent one face of the body, and manually operable means pivotally mounted on one of said pins swingable, at times, outwardly away from the body whereby to facilitate rotation of said last mentioned pin, and at other times into locking engagement with the remaining of the rotatable pins whereby to secure said pins and the gears mounted thereon against rotation.

3. A sawing machine blade anchoring means, comprising a substantially flat body having a plurality of intercommunicating semi-circularly shaped chambers formed therein opening onto one of its faces and spaced longitudinally disposed bearing openings formed therein individually adjacent to and communicating with said chambers, headed pins rotatably mounted in each of said bearing openings extended beyond the opposite faces of the flat body, enmeshed segmental gears mounted on portions of said pins and received in and rotatable in said chambers, spaced spurs on one end of and extended from the body, and manually operable means connected to one of the rotatable pins whereby to, at times, facilitate rotation of the same, and at other times to lock said pins and segmental gears against rotation.

4. In combination with the articulated endless saw carrying blade of a portable sawing machine, said blade having relatively longitudinally disposed and spaced openings therein, a substantially flat body having a plurality of relatively vertically spaced and outwardly extending spurs on one end thereof, a plurality of spaced and headed pins rotatably mounted in and longitudinally of the body extending outwardly from one side thereof for selective engagement in and through certain of said openings in the blade, gears fixedly connected to portions of said pins enmeshed and adjacent one side of said body, and manually operable means connected to one of said rotatable pins whereby to facilitate its rotation and the concurrent rotation of the other of said pins to align or disalign the heads of the same with relation to the blade openings respectively receiving the same.

5. A sawing machine blade anchoring device, comprising a body, selectively engageable spurs and extended outwardly from one end of the body, a plurality of collectively rotatable headed pins, journaled in and disposed transversely of the body, the heads of which are disposed laterally of one side of said body, and rotation imparting means connected to one of said pins swingable toward or from the body, said means being operable to impart collective rotation to the headed pins and being swingable toward and into engagement with the remaining pin whereby to lock said pins against rotation.

MATT PENNANEN.

References Cited in the file of this patent

UNITED STATES PATENTS

| Number | Name | Date |
|---|---|---|
| 1,063,986 | Lowe et al. | June 10, 1913 |
| 1,790,512 | Segal | Jan. 27, 1931 |
| 2,370,556 | Mall | Feb. 27, 1945 |
| 2,525,110 | Adair | Oct. 10, 1950 |
| 2,567,886 | Mall et al. | Sept. 11, 1951 |
| 2,572,402 | Stone et al. | Oct. 23, 1951 |